Sept. 5, 1950   P. S. POTTS   2,521,535
DYNAMOELECTRIC MACHINE WITH BEARING COOLING MEANS
Filed June 15, 1948

Inventor:
Phil S. Potts,
by Prancell S. Mack
His Attorney.

Patented Sept. 5, 1950

2,521,535

UNITED STATES PATENT OFFICE 2,521,535

DYNAMOELECTRIC MACHINE WITH BEARING COOLING MEANS

Phil S. Potts, Fort Wayne, Ind., assignor to General Electric Company, a corporation of New York Application June 15, 1948, Serial No. 33,027

13 Claims. (Cl. 172—285)

This application relates to bearing assemblies for dynamo-electric machines and more particularly to a cooled bearing assembly for inductor eddy current dynamometers of the water-in-the-gap type.

In the design of water-in-the-gap eddy current dynamometers, an important consideration is the ambient temperature at which the bearings are operated. Bearing overheating in such machines is attributable to two causes: The hot cooling fluid which has abstracted the head from the eddy current surface and which has been thrown centrifugally into the end space at the end of the rotor, strikes the end shields of the machine transmitting heat thereto which in turn is transmitted to the bearings; and heat from the rotor is transmitted along the shaft to the bearing. In some machines, this problem may be very serious since the heat from the outlet cooling fluid and from the mass of the rotor frequently results in the bearing operating in an ambient approaching 100° C. Such temperatures have been found to be too high for the operation of grease lubricated bearings and thus it is desirable to provide means for cooling the bearing without, however, removing heat to the point where the bearing housing is chilled and contracted sufficiently to prevent the bearing from sliding axially therein as the shaft is heated and expanded.

An object of this invention is to provide an improved bearing assembly for a water-in-the-gap eddy current dynamometer.

Another object of this invention is to provide an improved bearing assembly for a water-in-the-gap eddy current dynamometer wherein means are required for cooling the area surrounding the bearings.

Further objects and advantages of this invention will be better understood from the following description referring to the accompanying drawing. The features of novelty which characterize this invention will be pointed out with particularity in the claims annexed to and forming a part of this specification.

In accordance with this invention, there is provided an end shield and bearing housing member for a water-in-the-gap eddy current dynamometer adapted for the circulation of cooling fluid therein to form two heat dams; one to prevent the heat from the rotor from raising the temperature of the immediate bearing surroundings and the other to prevent heat from the outlet fluid from raising the temperature of the bearing housing.

Figure 1:
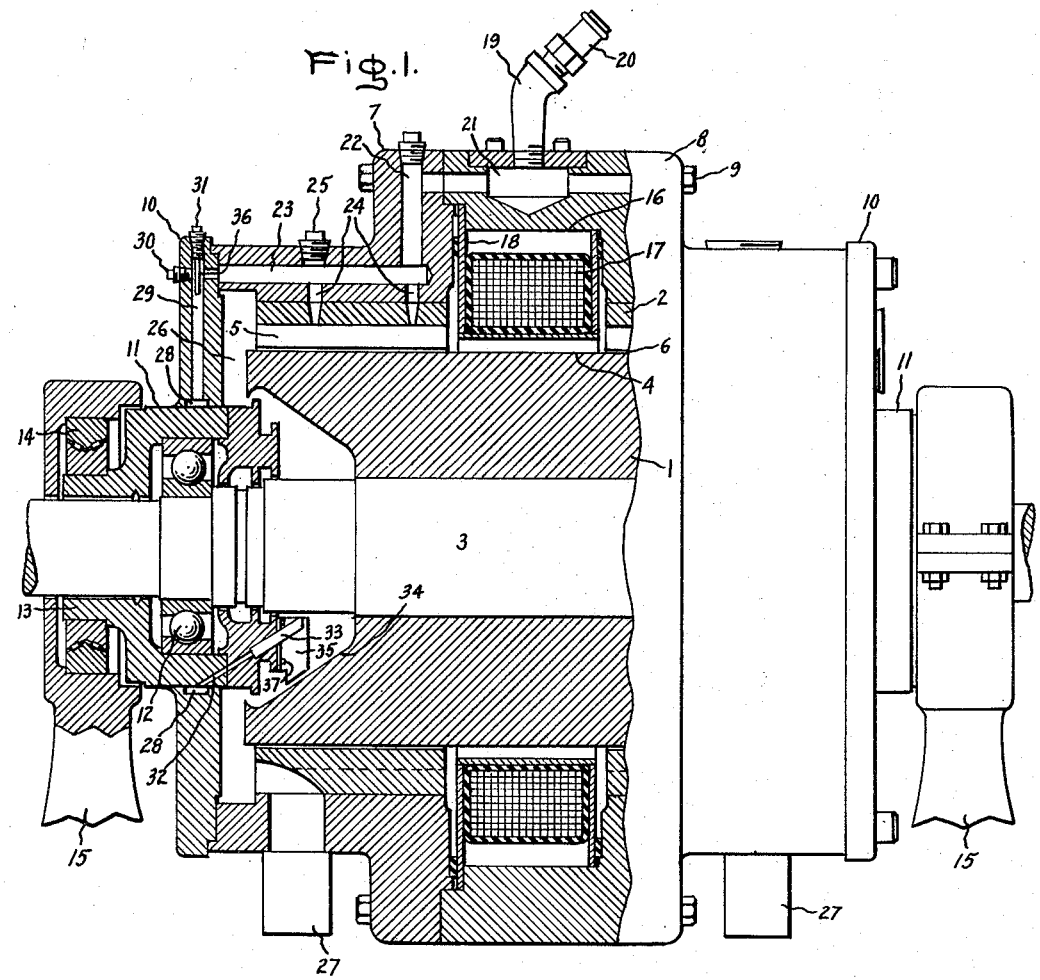
Figure 2:
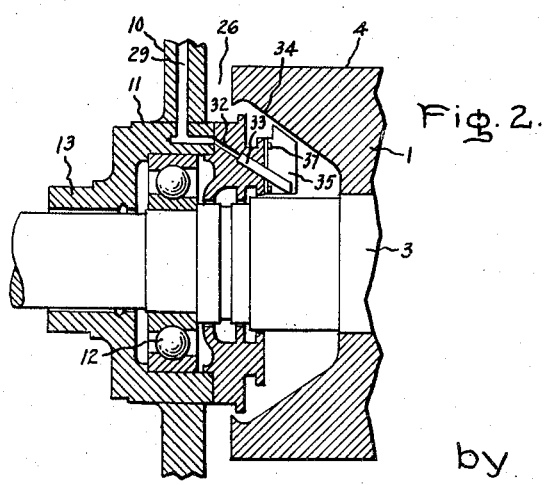

In the drawing, Fig. 1 is a side elevational view, partly in section, of a water-in-the-gap eddy current dynamometer provided with an embodiment of this invention; and Fig. 2 is a fragmentary view of the bearing area of such a machine provided with a modification of this invention.

Referring now to Fig. 1, there is shown an eddy current dynamometer of the water-in-the-gap type provided with a pair of relatively rotatable members 1 and 2. Rotor member 1 is mounted on rotatable shaft 3 and may be conveniently provided with a relatively smooth exterior surface 4 adapted for the generation of eddy currents therein. The outer stator member 2 is divided into two portions and has a toothed inner periphery 5 defining an air gap 6 with the exterior surface 4 of the rotor member 1. The stator segments 2 are respectively secured to outer casing segments 7 and 8 which are held together in any convenient manner such as by thru-bolts 9. A pair of end shields 10 are mounted on the casing segments, each being provided with bearing housing 11. Ball bearing 12 is positioned within the bearing housing 11 and rotatably supports the shaft 3. The bearing housing 11 is also provided with an outwardly extending flange portion 13 surrounding the shaft 3. This outwardly extending flange portion is rotatably supported by trunnion bearings 14 mounted in supporting pedestal 15. An annular coil cavity 16 is formed by the casing segments 7 and 8 between the stator segments 2. An annular exciting coil 17 is positioned in this cavity and is supported by a water-tight coil-supporting casing 18. Energization of the exciting winding 17 produces a magnetic excitation of the stator sections 2 and the rotor 1, and rotation of the smooth surface 4 of the rotor 1 adjacent the teeth 5 induces eddy currents in the rotor member, which may cause a considerable rise in the temperature of this member.

It is desirable that the heat produced by the eddy currents generated in the rotor member 1 be rapidly dissipated in order to maintain efficient operation of the machine. In order to provide for the abstraction of heat from the rotor member 1, means are provided for the introduction of cooling fluid directly into the air gap 6. Here, cooling fluid is introduced to the casing section 8 through an inlet pipe 19 connected by a flexible hose portion 20 to a suitable supply of cooling fluid. The cooling fluid passes serially from a header 21 in casing member 8 through passages 22 and 23 in the casing member 7 and is then introduced into the air gap 6 through inlet openings 24 positioned in the space between the teeth 5. Pipe plugs 25 are provided for conveniently cleaning the inlet openings 24. The cooling fluid introduced into the air gap through the inlet openings 24 forms a thin film on the exterior surface 4 of the rotor member 1 abstracting the heat therefrom. As the rotor member 1 rotates, the heated fluid passes out of the air gap into the end space 26 and is exhausted from the machine through outlets 27.

It can now be readily seen that the heated fluid which passes out of the air gap 6 will be flung centrifugally against end shield 10 transmitting heat thereto, which in turn will be transmitted to the bearing housing 11 and the bearing 12. Furthermore, heat from the rotor member 1 will be transmitted by the shaft 3 to the bearing 12. Thus, heat from two sources tends to be transmitted to the bearing 12 causing the bearing and the bearing housing 11 to become overheated and to detrimentally affect the operation of the machine.

In order to provide for cooling the bearing housing 11 and bearing 12, the arrangement now to be described is provided. An annular channel 28 is formed in the end shield 10 around the bearing housing 11 and adjacent thereto. A passage 29 in the end shield 10 connects the annular channel 28 with the axial channel 23 in the casing member 7. Pipe plugs 30 and 31 are respectively provided for conveniently cleaning passages 23 and 29. Projection 36 on pipe plug 31 is provided for regulating the flow of cooling fluid in the passage 29. It can be readily seen that when cooling fluid is introduced to the machine through the inlet 19, a portion of the fresh cooling fluid will flow into the annular channel 28 through the passages 29 and 23. The cooling fluid in the annular channel 28 forms an annular ring around the bearing housing 11, extending over the greater part of the width of the end shield 10, thus providing a heat dam which assumes the heat transmitted to the end shield 10 from the hot fluid exhausted from the air gap 6. Another passage 32 is formed in the bearing housing 11 and has one end communicating with the annular channel 28 and an outlet 33 near the shaft 3. A recess 34 is provided at the end of the rotor member 1 and the outlet 33 of passage 32 projects into this recess, thus the cooling fluid after passing through the annular channel 28 flows through the passage 32 and is introduced into the recess 34 on to the shaft 3. Here, the cooling fluid forms a second heat dam which absorbs the heat transmitted from the rotor member 1 along the shaft 3. From this second heat dam the cooling fluid is pumped by rotation of the shaft 3 and the rotor 1 into the end space 26 where it is exhausted through the outlets 27 along with the heated fluid exhausted from the air gap 6. Thus, it can be seen that fresh cooling fluid bled off from the passage 23 is serially circulated through the passage 29 in the end shield 10, the annular channel 28 around the bearing housing 11, and then through the passage 32 into the recess 34 and on to the shaft 3 adjacent the end of the rotor member 1 where it is subsequently exhausted into the end space 26 and out of the machine through the outlet openings 27. A baffle member 35 is positioned in the recess 24 beside the outlet 33 of the passage 32 and is secured to the bearing housing 11 by any suitable means such as bolts 37. This baffle serves to direct the cooling fluid initially on to the shaft 3 by interrupting the flow of air which would normally be rotating about the shaft and which would force the cooling fluid into the recess 34 before it made intimate contact with the shaft. Once intimate contact is made, the cooling fluid forms a tight film on the shaft and thence flows and is pumped along the shaft and the end of the rotor 1 without being disturbed by the air which might be rotating in the recess 34. Thus the two heat dams provided by the circulation of cooling fluid through the channel 28 and the introduction of the fluid on to the shaft 3 adjacent the end of the rotor 1 abstract the heat which tends to be transmitted to the bearing 12 from both sources, i. e., from the heated fluid from the air gap 6 thrown centrifugally against the end shield 10, and from the rotor 1 along the shaft 3.

It has been found that the amount of cooling fluid which may be passed through the annular channel 28 around the bearing housing 11 is somewhat critical since sufficient flow must be provided to form a heat dam against the heat in the end shield 10 but not enough to remove heat from the bearing housing 11 to the point where it is so chilled that it contracts sufficiently to hold the bearing 12 and prevent it from sliding axially in the bearing housing 11 as the shaft 3 is heated and expanded. It may be desirable, therefore, in some machines to provide only the heat dam at the end of the rotor member 1. Referring now to Fig. 2 in which like parts are indicated by like reference numerals, there is shown a modification of the dynamometer of Fig. 1 utilizing only a single heat dam. It can be readily seen that the annular channel 28 of Fig. 1 has been eliminated and the passage 29 in end shield 10 communicates directly with the passage 32 in the bearing housing 11. Thus, the fresh cooling fluid which is bled off from the passage 23 into the passage 29 is introduced into the cavity 34 and on to the shaft 3, through passage 32 in the bearing housing 11 and outlet 33. Here, the cooling fluid forms a heat dam to abstract the heat from the rotor member 1 which passes along the shaft 3 and is then thrown into the end spaces 26 for ultimate exhausting through the outlets 27. Baffle member 35 is again positioned in the recess 34 adjacent the outlet 33 and is secured to the bearing housing 11 by bolts 37. The cooling fluid is initially directed on to the shaft 3 by the baffle as described above.

It will now be readily understood that this invention provides a simple and efficient means for preventing heating of the bearings of water-in-the-gap eddy current dynamometers due to splashing of the hot exhausted fluid from the air gap and transmission of heat from the rotor along the shaft. While this invention is shown here as applied to a water-in-the-gap eddy current dynamometer, it will be readily apparent that it is also applicable to other dynamoelectric machines in which the same problem is present.

While there is illustrated and described particular embodiments of this invention, modifications thereof will occur to those skilled in the art. I desire it to be understood, therefore, that this invention is not to be limited to the particular arrangements disclosed and I intend in the appended claims to cover all modifications which do not depart from the spirit and scope of this invention.

What I claim as new and desire to secure by Letters Patent of the United States is:

1. A bearing assembly for a dynamoelectric machine having a rotor mounted on a shaft comprising a bearing housing, a bearing positioned in said housing for rotatably supporting said shaft, and means for serially circulating cooling fluid through said bearing housing and into said machine for introduction to said shaft adjacent the end of said rotor, said cooling fluid circulating through said bearing housing forming a heat dam for abstracting heat from any external source before said heat reaches said bearing and said cooling fluid introduced on to said shaft forming a second heat dam for abstracting heat from said rotor before said rotor heat reaches said bearing, said means including an annular channel in said bearing housing and a passage in said bearing housing communicating with said channel and having an outlet directed toward said shaft adjacent the end of said rotor.

2. A bearing assembly for a dynamoelectric machine having a rotor mounted on a shaft comprising a bearing housing, and end shield for said dynamoelectric machine extending from said bearing housing, a bearing positioned in said bearing housing for rotatably supporting said shaft, an annular channel in said end shield for circulating cooling fluid around said bearing housing to form a heat dam whereby heat in said end shield is abstracted before reaching said bearing, and a passage in said bearing housing communicating with said channel and having an outlet directed toward said shaft adjacent the end of said rotor for introducing cooling fluid from said channel to said shaft to form a second heat dam whereby heat from said rotor is abstracted before reaching said bearing.

3. A bearing assembly for a dynamoelectric machine having a rotor mounted on a shaft comprising a bearing housing, an end shield for said dynamoelectric machine extending from said bearing housing, a bearing positioned in said bearing housing for rotatably supporting said shaft, an annular channel in said end shield adjacent said bearing housing for circulating cooling fluid around said bearing housing to form a heat dam whereby heat in said end shield is abstracted before reaching said bearing, and a passage in said bearing housing communicating with said channel and having an outlet directed toward said shaft adjacent the end of said rotor for introducing cooling fluid from said channel to said shaft to form a second heat dam whereby heat from said rotor is abstracted before reaching said bearing.

4. A bearing assembly for a dynamoelectric machine including a rotor mounted on a shaft and having a recessed portion formed at one axial end, said bearing assembly comprising a bearing housing, an end shield for said dynamoelectric machine extending from said bearing housing, a bearing positioned in said bearing housing for rotatably supporting said shaft, an annular channel in said end shield for circulating cooling fluid around said bearing housing to form a heat dam whereby heat in said end shield is abstracted before reaching said bearing, and a passage in said bearing housing communicating with said channel and having an outlet in said rotor recess directed toward said shaft for introducing cooling fluid from said channel into said rotor recess and onto said shaft to form a second heat dam whereby heat from said rotor is abstracted before reaching said bearing.

5. A bearing assembly for a dynamoelectric machine having a rotor mounted on a shaft comprising a bearing housing, an end shield for said dynamoelectric machine extending from said bearing housing, a bearing positioned in said bearing housing for rotatably supporting said shaft, an annular channel in said end shield for circulating cooling fluid around said bearing housing to form a heat dam whereby heat in said end shield member is abstracted before reaching said bearing, a passage in said bearing housing communicating with said channel and having an outlet near said shaft adjacent the end of said rotor for introducing cooling fluid from said channel to said shaft to form a second heat dam whereby heat from said rotor is abstracted before reaching said bearing, and a baffle mounted on said bearing housing adjacent said passage outlet for directing said cooling fluid onto said shaft.

6. A bearing assembly for a dynamoelectric machine including a rotor mounted on a shaft and having a recessed portion formed at one axial end, said bearing assembly comprising a bearing housing, an end shield for said dynamoelectric machine extending from said bearing housing, a bearing positioned in said bearing housing for rotatably supporting said shaft, an annular channel in said end shield for circulating cooling fluid around said bearing housing to form a heat dam whereby heat in said end shield member is abstracted before reaching said bearing, a passage in said bearing housing communicating with said channel and having an outlet in said rotor recess near said shaft for introducing cooling fluid from said channel into said rotor recess and onto said shaft adjacent the end of said rotor to form a second heat dam whereby heat from said rotor is abstracted before reaching said bearing, and a baffle mounted on said bearing housing adjacent said passage outlet and projecting into said recess for directing said cooling fluid on to said shaft.

7. A bearing assembly for a dynamoelectric machine having a rotor mounted on a shaft comprising a bearing housing, a bearing positioned in said bearing housing for rotatably supporting said shaft, and a passage in said bearing housing having an outlet directed toward said shaft adjacent the end of said rotor for introducing cooling fluid to said shaft to form a heat dam whereby heat from said rotor is abstracted before reaching said bearing.

8. A bearing assembly for a dynamoelectric machine including a rotor mounted on a shaft and having a recessed portion formed at one axial end, said bearing assembly comprising a bearing housing, an end shield for said dynamoelectric machine extending from said bearing housing, a bearing positioned in said bearing housing for rotatably supporting said shaft, a passage in said bearing housing having an outlet in said rotor recess near said shaft for introducing cooling fluid into said rotor recess and on to said shaft adjacent the end of said rotor to form a heat dam whereby heat from said rotor is abstracted before reaching said bearing, and a baffle mounted on said bearing housing adjacent said passage outlet and projecting into said recess for directing said cooling fluid onto said shaft.

9. A bearing assembly for a dynamometer of the water-in-the-gap type having a rotor member mounted on a shaft and a stator member with means for introducing cooling fluid into the air gap between said members, said bearing assembly comprising a bearing housing, an end shield for said dynamometer extending from said bearing housing, a bearing positioned in said bearing housing for rotatably supporting said shaft, an annular channel in said end shield communicating with said introducing means for circulating cooling fluid around said bearing housing to form a heat dam whereby heat in said end shield produced by splashing of heated fluid from said air gap is abstracted before reaching said bearing, and a passage in said bearing housing communicating with said channel and having an outlet directed toward said shaft adjacent the end of said rotor for introducing cooling fluid from said channel to said shaft to form a second heat dam whereby heat from said rotor is abstracted before reaching said bearing.

10. A bearing assembly for a dynamometer of the water-in-the-gap type including a rotor member mounted on a shaft and having a recessed portion formed at one axial end and a stator member with means for introducing cooling fluid into the air gap between said members, said bearing assembly comprising a bearing housing, an end shield for said dynamometer extending from said bearing housing, a bearing positioned in said bearing housing for rotatably supporting said shaft, an annular channel in said end shield communicating with said introducing means for circulating cooling fluid around said bearing housing to form a heat dam whereby heat in said end shield produced by splashing of heated fluid from said air gap is abstracted before reaching said bearing, and a passage in said bearing housing communicating with said channel and having an outlet in said rotor recess directed toward said shaft for introducing cooling fluid from said channel into said rotor recess and on to said shaft to form a second heat dam whereby heat from said rotor is abstracted before reaching said bearing.

11. A bearing assembly for a dynamometer of the water-in-the-gap type having a rotor member mounted on a shaft and a stator member with means for introducing cooling fluid into the air gap between said members, said bearing assembly comprising a bearing housing, an end shield for said dynamometer extending from said bearing housing, a bearing positioned in said bearing housing for rotatably supporting said shaft, an annular channel in said end shield communicating with said introducing means for circulating cooling fluid around said bearing housing to form a heat dam whereby heat in said end shield produced by splashing of heated fluid from said air gap is abstracted before reaching said bearing, and a passage in said bearing housing communicating with said channel and having an outlet near said shaft adjacent the end of said rotor for introducing cooling fluid from said channel to said shaft to form a second heat dam whereby heat from said rotor is abstracted before reaching said bearing, and a baffle mounted on said bearing housing adjacent said passage outlet for directing said cooling fluid on to said shaft.

12. A bearing assembly for a dynamometer of the water-in-the-gap type having a rotor member mounted on a shaft and a stator member with means for introducing cooling fluid into the air gap between said members, said bearing assembly comprising a bearing housing, a bearing positioned in said bearing housing for rotatably supporting said shaft, a passage in said bearing housing communicating with said introducing means and having an outlet directed toward said shaft adjacent the end of said rotor for introducing cooling fluid to said shaft to form a heat dam whereby heat from said rotor is abstracted before reaching said bearing.

13. A bearing assembly for a dynamometer of the water-in-the-gap type including a rotor member mounted on a shaft and having a recessed portion formed at one axial end and a stator member with means for introducing cooling fluid into the air gap between said members, said bearing assembly comprising a bearing housing, a bearing positioned in said bearing housing for rotatably supporting said shaft, a passage in said bearing housing communicating with said introducing means and having an outlet in said rotor recess directed toward said shaft for introducing cooling fluid into said rotor recess and on to said shaft to form a heat dam whereby heat from said rotor is abstracted before reaching said bearing.

PHIL S. POTTS.

REFERENCES CITED

The following references are of record in the file of this patent:

UNITED STATES PATENTS

| Number | Name | Date |
|---|---|---|
| 1,227,880 | Brown | May 29, 1917 |
| 1,269,909 | Cooper | June 18, 1918 |
| 2,281,971 | Goddard | May 5, 1942 |
| 2,351,963 | Hayes | June 20, 1944 |
| 2,352,206 | Kendall | June 27, 1944 |
| 2,403,421 | Winther | July 2, 1946 |
| 2,440,551 | Martin | Apr. 27, 1948 |
| 2,453,509 | Hugin | Nov. 9, 1948 |
| 2,462,451 | Winther | Feb. 22, 1949 |